United States Patent Office 3,541,180
Patented Nov. 17, 1970

3,541,180
ALKYLATION OF ISOBUTENE WITH ETHYLENE OR PROPYLENE AND WITH AN ALUMINO-SILICATE CATALYST
Charles L. Thomas, Swarthmore, Pa., assignor to Sun Oil Company, Philadelphia, Pa., a corporation of New Jersey
No Drawing. Filed June 25, 1968, Ser. No. 739,625
Int. Cl. C07c 3/52
U.S. Cl. 260—683.43                4 Claims

ABSTRACT OF THE DISCLOSURE

Preparation of 2,2-dimethylbutane or 2,2-dimethylpentane by alkylation of isobutane with ethylene or propylene in the presence of an alumino-silicate catalyst characterized by having a silicon:aluminum atomic ratio in the range of 1:2 and a pore size of less than 2 angstroms.

---

This invention relates to the thermal alkylation of isobutane with ethylene or propylene, and particularly to the thermal alkylation in the presence of a solid free radical catalyst. More specifically, the invention relates to the preparation of 2,2-dimethylbutane or 2,2-dimethylpentane.

For many years it has been well known in the petroleum industry to react paraffins with olefins to produce liquid hydrocarbons in the motor fuel boiling range having high octane numbers. Commercially, these alkylations are carried out in the presence of a catalyst, such as $H_2SO_4$, HF, or $AlCl_3$, or the reactants are subjected to thermal alkylation at high pressures and temperatures. The mechanism of the acid-catalyzed reaction has been determined to be a carbonium ion transfer, and the primary product derived from this alkylation of isobutane with ethylene is 2,3-dimethylbutane. Examples of such catalyzed reactions can be found in U.S. Pats. 3,251,902, 2,971,903, and 2,653,982.

In particular, U.S. Pat. 3,251,902 discloses that when paraffins such as isobutane and olefins such as ethylene are reacted in the presence of a crystalline aluminosilicate having uniform pore openings of at least 7 angstroms and an activity constant of at least 5, alkylation takes place and the primary product is 2,3-dimethylbutane. A wide range of conditions is suitable for the reaction, as the temperature may vary from room temperature to 600° F. and the pressure from atmospheric to about 5000 p.s.i.g.

The thermal alkylation of isobutane and ethylene has also found substantial success in the petroleum industry; and several patents, such as U.S. Pats. 2,209,450, 2,002,-394, and 2,104,296, have issued related thereto. In these reactions, the paraffin and olefin are generally subjected to temperatures of about 500° C. and pressures around 5000 p.s.i.g. It should be noted, however, that the primary product of this reaction when isobutane and ethylene are the reactants is 2,2-dimethylbutane, or as is commonly known, neohexane. The distinction between the products is based on the fact that the thermal alkylation, unlike the carbonium ion transfer of the heretofore discussed catalyzed reaction, is a free radical mechanism. The mechanism for this reaction has been disclosed in Chain Transfer in Free Radical Alkylation, Wald et al., A. C. S. Petroleum Division Papers, vol. 8, No. 1, page 103, March 1963; and Free Radical Alkylation of Isobutane with Ethylene, Ridgeway, J. A., Industrial and Engineering Chemistry, vol. 50, No. 10, page 1531, October 1958. From the above, it can be concluded that the substantial formation of 2,2-dimethylbutane is prima facie evidence of a free radical reaction, and conversely the formation of 2,3-dimethylbutane is prima facie evidence of a carbonium ion mechanism.

It has now been discovered that the thermal alkylation of isobutane and an olefin, ethylene or propylene, can be improved when the reaction takes place in the presence of a crystalline free radical catalyst. The free radical catalyst reaction can be carried out at lower temperatures while converting a substantial amount of the ethylene or propylene to the product. As mentioned supra, the products of the reactions are 2,2-dimethylbutane and 2,2-dimethylpentane, respectively. The alkylation is still operated at relatively high pressures, i.e., in the range of 2500 to 7500 p.s.i.g.; however, the temperatures employed, 300° to 400° C., are substantially lower than those generally used in a thermal reaction.

The catalysts to be employed in the present invention are any such crystalline catalysts which contain free radicals at room temperature. Catalyst within this classification include those metallic aluminosilicate framework structures in which the silicon-aluminum atomic ratio is in the range of 1:2, and in which the pores or openings leading to the small cavities within the structure are less than 2 angstroms. Silicates falling within these requirements include members of the sodalite group, natural ultramarine (lazurite), and synthetic ultramarines. The sodalite group members having these characteristics include a number of cubic minerals of complex structure; e.g., sodalite $Na_8Al_6Si_6O_{24}Cl_2$, naselite $Na_8Al_6Si_6O_{24}SO_4$, haüynite $(Na, Ca)_{4-8}Al_6O_{24}(SO_4)_{1-2}$. All of these materials contain substantial quantities of sodium which can be base-exchanged with a variety of other elements, such as calcium, magnesium, silver, and zinc, and still retain all of its free radical character. The methods of base-exchange are fully disclosed in the prior art.

Synthetic ultramarines, such as ultramarine blue, is produced by calcining at about 1500° F. for about 24 hours a mixture of sulfur, silica, clay, soda ash, and a reducing agent. The reducing agent is generally rosin, pitch, or charcoal, and china clay may be the source of silica. After firing and cooling, the calcined material is carefully washed to remove sodium sulfate and other soluble salts formed in the process. The washed material is then wet-ground, water-levigated, dried, and powdered.

Unlike the other well-known crystalline aluminosilicate cage structures, e.g., the zeolites, all catalytic action with the sodalite or ultramarine catalysts occurs on the outside surface of the framework rather than in the internal cavities. This is due to the fact that the pore diameters to the cavities are less than 2 angstroms in diameter, whereas the zeolite openings are generally 5 to 16 angstroms in diameter. Although the pores are large enough for the passage of some ions, and hence the crystalline structures may be called "ion-sieves," the openings are too small to be used as molecular sieves. Further, unlike the zeolites, the sodalites and ultramarines are anhydrous.

The determination that aluminosilicates having the aforementioned characteristics, and in particular that the members of the sodalites and ultramarines are free radical catalysts, is based on electron spin resonance (ESR) spectroscopy (see Organic Chemistry, Second edition: Morrison and Boyd, Allyn and Bacon, Inc., 1967, page 410). A free radical is an atom or group of atoms possessing an odd electron, and as such when the free radical is placed in a magnetic field the electron spins and generates a magnetic moment. In order to change the spin state of the electron, energy provided by absorption of radiation of the proper frequency is required. This absorption produces a spectrum called an ESR spectrum. The signals produced thereby can be used to detect the presence of free radicals and measure their concentration. D. M. Gardner and G. K. Fraenkel, J. Amer. Chem. Soc. 77, 6399 (1955), used this technique on several samples of both natural and synthetic ultramarines and showed the presence of free radicals. This was confirmed by Yoshio Matsunaga, Can. J. Chem. 37, 994 (1959), who showed the effect of ion exchange (replacing Na with other ions) on the intensity of the ESR spectra, i.e., the concentration of free radicals.

The general process of the invention consists in subjecting a mixture of isobutane and olefin, the olefin not exceeding 10% by weight of the isobutane, to a temperature in the range of 300° to 400° C. and a pressure of 2500 to 7500 p.s.i.g. in the presence of a crystalline aluminosilicate free radical catalyst as aforedescribed. It should be noted that although the concentration of olefin should not exceed 10% at any instant, the total reaction may involve more than 10%. If the reaction is to be run on a continuous basis, incremental additions of ethylene or propylene should be made periodically to the reactor, but such additions should not allow the concentration of the olefin to exceed the aforementioned 10%. Preferably, the reaction is such that the olefin concentration is maintained at 5% by weight of the isobutane present, and the temperature and pressure are maintained at 400° C. and 5000 p.s.i.g., respectively. As is well known in the art, the olefin additions are injected into the isobutane at a multiplicity of points so that the reaction is spread out over a wide range and the heat liberated in the reaction can be controlled.

The free radical catalyst may be used as a finely divided solid, in which case it is a powder suspended as a dust in the gases as they undergo reaction; or in the alternative, the catalyst may be formed into pellets and used as a fixed bed through which the reacting isobutane and ethylene are passed. In either form, no limitation is placed on the amount of catalyst which should be present during the reaction; however, as a minimum at least 0.1% by weight based on the ethylene or propylene present is generally employed. It should be noted that free radical catalysts are distinguishable from free radical initiators, such as benzoyl peroxide, etc., in that the catalyst actually takes part in the reaction forming complex compounds, whereas the initiator merely initiates the production of free radicals.

Although the predominant product formed by the alkylation of isobutane with ethylene or propylene is produced by a free radical mechanism, the same cannot be said for alkylations with olefins higher than propylene. This is due to the presence of allylic hydrogens in the higher olefins which are abstracted by the free radical during the reaction, thus forming allyl radicals and preventing the desired alkylation. The allyl radicals react to form undesirable by-products and produce no greater than 10% by weight free radical alkylation. It should be noted that although propylene contains an allylic hydrogen and some undesirable by-products are formed, the free radical reaction still takes place to a useful extent and at least 40% by weight of the product is 2,2-dimethylpentane.

As a specific example of the instant invention, Bleachette Laundry Blue, an ultramarine blue manufactured by American Cyanamid Company, is formed into pellets and placed into a tubular reactor which is heated to approximately 400° C. The reactor is equipped with a multiplicity of injection points for injecting ethylene as desired to maintain the proper ratio of isobutane to ethylene. A feed mixture of isobutane and 5% by weight ethylene under a pressure of 3500 p.s.i.g. is passed through the reactor while maintaining the temperature at about 400° C. As the feed passes over the catalyst, incremental injection of ethylene is made to the reactor to keep the ethylene concentration at 5%. The ethylene is converted into 2,2-dimethylbutane. The unreacted isobutane is recovered and then recycled.

While the particular methods as described herein are well adapted to meet the objections of the present invention, various modifications or changes may be resorted to without departing from the scope of the invention as defined in the claims.

I claim:
1. An alkylation process for the preparation of 2,2-dimethylbutane or 2,2-dimethylpentane which comprises alkylating isobutane with up to about 10% by weight of said isobutane of ethylene or propylene at a temperature from about 300° C. to about 400° C., at a pressure of from about 2500 to about 7500 p.s.i.g., and in the presence of a catalyst characterized by being an alumino-silicate having a silicon:aluminum atomic ratio in the range of 1:2 and a pore size of less than 2 angstroms.

2. An alkylation process as described in claim 1 wherein the crystalline aluminosilicate catalyst is selected from the group consisting of sodalite, naselite, hauynite, natural ultramarine, and synthetic ultramarines.

3. An alkylation process as described in claim 1 wherein the crystalline aluminosilicate catalyst is sodalite.

4. An alkylation process as described in claim 1 wherein the crystalline aluminosilicate is ultramarine blue.

References Cited
UNITED STATES PATENTS

| | | |
|---|---|---|
| 3,251,902 | 5/1966 | Garwood et al. 260—683.43 |
| 3,254,023 | 5/1966 | Miale et al. 260—683.43 |
| 2,904,607 | 9/1959 | Mattox et al. 260—683.64 |
| 3,173,855 | 3/1965 | Miale et al. |
| 3,236,762 | 2/1966 | Rabo et al. 260—683.4 |
| 3,312,615 | 4/1967 | Cramer et al. 260—683.43 |
| 3,354,078 | 11/1967 | Miale et al. |
| 3,375,206 | 3/1968 | Shaw. |
| 3,437,604 | 4/1969 | Michalko. |

DELBERT E. GANTZ, Primary Examiner

G. J. CRASANAKIS, Assistant Examiner

U.S. Cl. X.R.

252—455